(No Model.)
M. SHEAHAN.
FLOAT AND PERCOLATOR FOR COFFEE POTS.
No. 354,490. Patented Dec. 14, 1886.
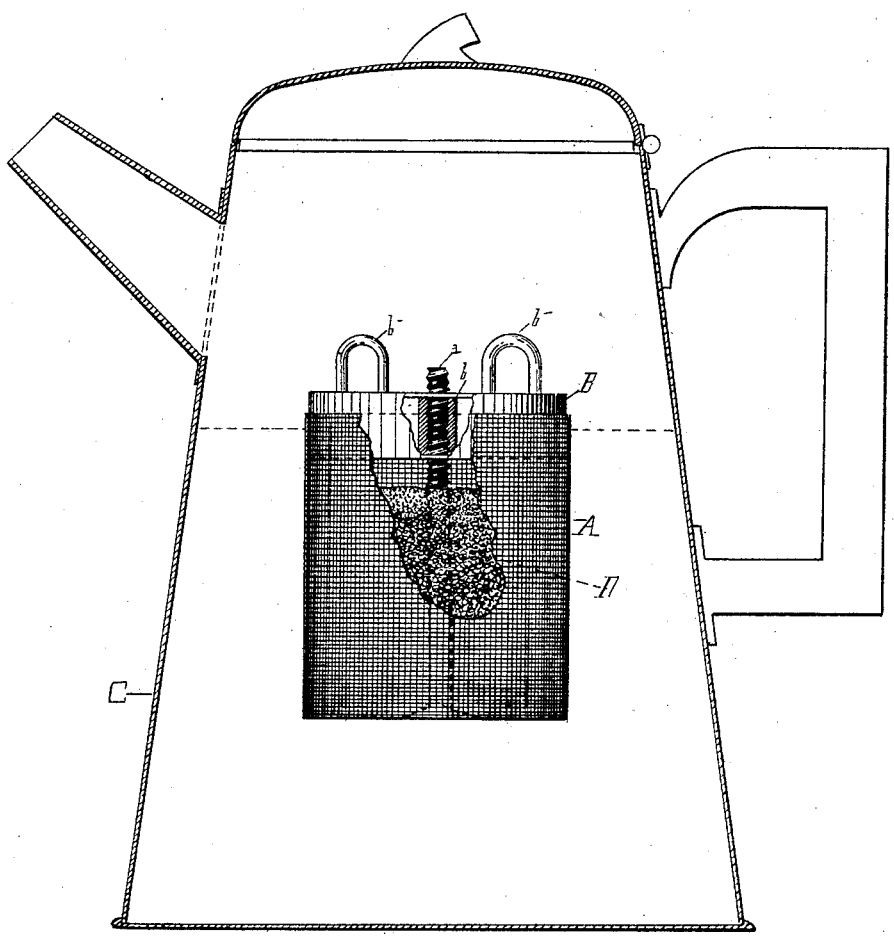
WITNESSES
C. A. Martin
Geo. W. King
Martin Sheahan INVENTOR
By
Leggett & Leggett Attorneys

UNITED STATES PATENT OFFICE.

MARTIN SHEAHAN, OF CLEVELAND, OHIO.

FLOAT AND PERCOLATOR FOR COFFEE-POTS.

SPECIFICATION forming part of Letters Patent No. 354,490, dated December 14, 1886.

Application filed March 10, 1886. Serial No. 194,708. (No model.)

*To all whom it may concern:*

Be it known that I, MARTIN SHEAHAN, of Cleveland, in the county of Cuyahoga and State of Ohio, have invented certain new and useful Improvements in Floats and Percolators for Coffee-Pots; and I do hereby declare the following to be a full, clear, and exact description of the invention, such as will enable others skilled in the art to which it appertains to make and use the same.

My invention is an improved float and percolator for coffee-pots; and it consists in certain features of construction and in combination of parts, hereinafter described, and pointed out in the claims.

The accompanying drawing is an elevation in section of a coffee-pot, showing my improved devices in position therein, portions being broken away to show the internal construction.

A represents a cylindrical percolator, made, preferably, of perforated sheet metal, open at the top and closed at the bottom. A small screw-rod, $a$, the threads thereof having a quick lead, is located centrally in the percolator, and is rigidly secured to the center of the bottom A'. The rod $a$ should extend a short distance above the upper end of the percolator.

B is a float, made, preferably, cylindrical in form and of suitable size to fit easily inside the percolator. A vertical tube, $b$, centrally located in the float, extends through both heads thereof, to which it is rigidly secured, forming tight joints. The tube is screw-threaded internally to engage the screw-threads of the rod, by means of which the float may be screwed up or down on the rods, and made to form an adjustable stopper for the percolator. Thumb-pieces $b$ are secured on top of the float to be used in turning the same. These thumb-pieces should be in the form of loops, as shown, so that they may serve as handles for removing the device from the coffee-pot. A suitable quantity of ground coffee is placed in the percolator, and the float is placed on the rod $a$ and screwed down to a position near the coffee. The device is then placed in the coffee-pot C, the latter having been supplied with a suitable quantity of hot water. The float supports the percolator in the water, so that the latter has free access to the coffee from the sides and bottom of the percolator. The coffee floats loosely in the water inside the percolator, and soon becomes thoroughly steeped in the substance extracted therefrom. The steeping swells the coffee, so that the latter, being confined by the float, is packed into a cake, and the extract is more or less forced out by such packing. After the few minutes required in extracting the strength of the coffee, the device is removed from the coffee-pot, carrying with it the coffee-grounds, and leaving only the pure extracts in the pot. For ordinary purposes the device is made small enough to be placed readily in any ordinary coffee-pot.

For hotel-restaurants and similar purposes, of course, large percolators and floats may be made.

What I claim is—

1. The combination, with a percolator, of a disk-shaped float for closing the mouth of the percolator and devices secured to the percolator for securing the float thereto, substantially as set forth.

2. The combination, with a percolator having an open end and a screw-rod secured to said percolator, of a hollow float for closing the mouth of the percolator, having a screw-threaded opening for the passage of screw-rod, substantially as set forth.

3. The combination, with a percolator having a screw-rod secured to the bottom thereof and projecting upwardly beyond the mouth, of the hollow float having the threaded tube secured therein and the loop secured to the upper side of said float, substantially as set forth.

In testimony whereof I sign this specification, in the presence of two witnesses, this 27th day of February, 1886.

MARTIN SHEAHAN.

Witnesses:
CHAS. H. DORER,
ALBERT E. LYNCH.